United States Patent
Webb et al.

(10) Patent No.: US 10,870,762 B2
(45) Date of Patent: Dec. 22, 2020

(54) METHODS AND SYSTEMS FOR PARTICULATE MATTER REMOVAL FROM A PROCESS EXHAUST GAS STREAM

(71) Applicant: ORION ENGINEERED CARBONS GMBH, Frankfurt am Main (DE)

(72) Inventors: Russell Webb, Kingwood, TX (US); Rodney Taylor, Wichita Falls, TX (US); Daniel Horn, Humble, TX (US); Ralf Bergsträsser, Elsdorf (DE); Donnie Loubiere, Humble, TX (US); Kay Schmidt, Köln (DE)

(73) Assignee: ORION ENGINEERED CARBONS GMBH, Frankfurt am Main (DE)

( * ) Notice: Subject to any disclaimer, the term of this patent is extended or adjusted under 35 U.S.C. 154(b) by 0 days.

(21) Appl. No.: 15/752,331

(22) PCT Filed: Aug. 10, 2016

(86) PCT No.: PCT/EP2016/069057
§ 371 (c)(1),
(2) Date: Feb. 13, 2018

(87) PCT Pub. No.: WO2017/029169
PCT Pub. Date: Feb. 23, 2017

(65) Prior Publication Data
US 2019/0085168 A1  Mar. 21, 2019

Related U.S. Application Data (60) Provisional application No. 62/205,146, filed on Aug. 14, 2015.

(51) Int. Cl.
*C09C 1/50* (2006.01)
*B01D 53/50* (2006.01)
*B01D 53/86* (2006.01)
*C09C 1/48* (2006.01)

(52) U.S. Cl.
CPC .............. *C09C 1/50* (2013.01); *B01D 53/502* (2013.01); *B01D 53/869* (2013.01); *B01D 53/8625* (2013.01); *C09C 1/48* (2013.01)

(58) Field of Classification Search
CPC ..................................................... C09C 1/50
See application file for complete search history.

(56) References Cited

U.S. PATENT DOCUMENTS

| | | | | |
|---|---|---|---|---|
| 3,861,885 A | * | 1/1975 | Schora | C09C 1/56 44/574 |
| 4,435,377 A | * | 3/1984 | Rothbuhr | C09C 1/565 106/478 |
| 6,938,411 B2 | | 9/2005 | Hoffmann et al. | |

FOREIGN PATENT DOCUMENTS

| | | | | |
|---|---|---|---|---|
| CN | 102240599 | | 11/2011 | |
| DK | 2015 00245 | † | 10/2016 | |
| EP | 0105113 | | 4/1984 | |
| EP | 0129903 A2 | | 1/1985 | |
| EP | 0369330 A2 | | 5/1990 | |
| EP | 0947234 A1 | | 10/1999 | |
| EP | 0953374 A1 | | 11/1999 | |
| EP | 2404656 A2 | | 1/2012 | |
| EP | 2749592 A1 | | 7/2014 | |
| GB | 411655 | * | 3/1933 | ............ B01D 53/00 |
| GB | 1349887 A | | 4/1974 | |
| JP | S54-9190 A | | 1/1979 | |
| JP | S56-37027 A | | 4/1981 | |
| JP | 2002021544 A | | 1/2002 | |
| JP | 2011256869 A | | 12/2011 | |
| JP | 2014-500942 A | | 1/2014 | |
| RU | 930192879 | | 1/1996 | |
| RU | 2210030 | | 8/2003 | |
| WO | 2005123226 | | 12/2005 | |
| WO | 2006/018059 A2 | | 2/2006 | |
| WO | 2007/035949 A2 | | 3/2007 | |
| WO | 2008/142353 A2 | | 11/2008 | |
| WO | 2011/128830 A1 | | 10/2011 | |
| WO | 2012/064734 A1 | | 5/2012 | |
| WO | 2012/149170 A1 | | 11/2012 | |
| WO | 2013/182502 A1 | | 12/2013 | |
| WO | 2013182502 A1 | † | 12/2013 | |
| WO | 2016/029926 A1 | | 3/2016 | |
| WO | 2016/037981 A1 | | 3/2016 | |
| WO | 2016169822 | | 10/2016 | |
| WO | 2016169822 A1 | † | 10/2016 | |

OTHER PUBLICATIONS

International Search Report and Written Opinion dated Nov. 24, 2016, from International Application No. PCT/EP2016/069057, 7 pages.
Air Emissions Facotrs and Quantifications AP42, 5th ED, Compilation of Air Pollutant Emission Factors, Carbon Black.
Office of Air Quality Planning and Standards, U.S. Environmental Protection Agency, Jan. 1995, AP-42, Fifth Edition, "Compilation of Air Pollutant Emission Factors, vol. 1: Stationary Point and Area Sources" Section 6.1, total of 19 pages.†

\* cited by examiner
† cited by third party

*Primary Examiner* — Stuart L Hendrickson
(74) *Attorney, Agent, or Firm* — Meunier Carlin & Curfman LLC (57) ABSTRACT

Disclosed herein are systems and methods for reducing the particulate matter content of an exhaust gas from a carbon black process.

17 Claims, 4 Drawing Sheets

METHODS AND SYSTEMS FOR PARTICULATE MATTER REMOVAL FROM A PROCESS EXHAUST GAS STREAM

BACKGROUND

Sulfur oxides (e.g., $SO_2$) are present in the waste gases discharged from many metal refining and chemical plants and in the flue gases (e.g., exhaust gases) from power plants generating electricity by the combustion of fossil fuels. The control of air pollution resulting from the discharge of sulfur oxides into the atmosphere has become increasingly urgent. An additional incentive for the removal of sulfur oxides from exhaust gases is the recovery of sulfur values otherwise lost by discharge into the atmosphere. However, the large volumes of these exhaust gases relative to the quantity of sulfur which they contain can make removal or recovery of sulfur compounds from these gases expensive. Also, while the possible by-products that may be ultimately obtained from the recoverable sulfur, such as elemental sulfur and sulfuric acid, have virtually unlimited markets as basic raw materials, they sell for relatively low figures. Consequently, efficient and low-cost removal and recovery processes are required.

In the U.S. and elsewhere, there are increasing legislative efforts to limit the amount of sulfur oxides from exhaust gases associated with carbon black production. Carbon black (also known as acetylene black, channel black, furnace black, lamp black, gas black, and thermal black) is a form of paracrystalline carbon with a high surface area to volume ratio. Carbon black is in the top 50 industrial chemicals manufactured worldwide, based on annual tonnage. In 2014, the total production of carbon black was about 16,144,000 metric tons. The most common uses for carbon black are as a pigment (for example, in plastics, paints, and inks) and as a reinforcing filler in tires and other rubber products.

Carbon black can be produced by combusting a hydrocarbon (e.g., aromatic hydrocarbon oils, mineral oils, vegetable oils, natural gas, acetylene, etc.) with oxygen inside large furnaces. By varying the amount of hydrocarbon and air, the internal temperature of the furnace can be altered, which permits manipulation of the particle size and particle connections of the carbon black being produced.

A carbon black producing process, for example, can occur in a carbon black process module which can employ a furnace reactor having a burner or combustion chamber followed by a reactor. A combustion gas feed stream, such as a hydrocarbon gas or liquid stream (e.g., natural gas, liquid hydrocarbon, or the like) can be combusted in the burner portion along with an oxidant feed gas stream such as air or oxygen, to produce hot combustion gases, which can then pass to the reactor portion of the furnace. In the reactor portion of the furnace, a hydrocarbon feedstock can be exposed to the hot combustion gases. Part of the feedstock can be burned, while the rest can be decomposed to form carbon black, hydrogen, and other gaseous products. The reaction products can then be quenched, and the resulting carbon black and reduced exhaust gas mixture can be conveyed to a bag collector or other filter system, whereupon the carbon black content can be separated from the reduced exhaust gas (also referred to as tail gas). The recovered carbon black can be finished to a marketable product, such as, for example, by pulverizing and wet pelletizing. The dried pellets can then be conveyed from the dryer to bulk storage or other handling.

Exhaust gases generated in the carbon black process module can also be subject to applicable air quality controls or requirements. Other than direct venting, exhaust gas emissions have been discharged using flares. The reduced exhaust gas can contain combustible gas components, meaning the reduced exhaust gas can be conveyed to burners or boilers for energy production, heat recovery, or incineration (e.g., further combustion). The composition of the reduced exhaust gas after separation of the carbon black and prior to any after-treatment may vary according to the grade of carbon black being produced and other process parameters. The reduced exhaust gas from carbon black manufacture can include combinations of one or more of the following: particulate matter, carbon oxides (CO and $CO_2$), sulfur compounds, nitrogen compounds, polycyclic organic matter, trace elements, and other components, some of which are classified by the U.S. Environmental Protection Agency as hazardous air pollutants (HAP). As such, environmental regulations require reductions in the amount of $SO_2$, and other components, emitted from carbon black facilities.

To date, the major carbon black facilities that treat their exhaust gas employ gas scrubbers to reduce the levels of $SO_2$. Gas scrubbers can generally be classified as dry scrubbers or wet scrubbers. Many gases, including $SO_2$, can be removed from exhaust gas by using a dry gas scrubber comprising an absorber material. The exhaust gas can be passed through a cartridge, which is filled with one or several absorber materials adapted to the chemical properties of the components to be removed. The component (e.g., $SO_2$) can be removed either by chemical reaction with a solid adsorbent or by adsorption on its surface followed by oxidation of the adsorbed component. In general, a reaction between a solid and gas is relatively slow and has inefficient reaction kinetics, being limited by the available surface area of the solid. Also, certain of the resultant products do not readily lend themselves to regeneration of the starting materials (meaning the absorber material has to be replaced after its surface has been saturated) or recovery of any removed sulfur values.

Wet scrubbers work via the contact of a target compound or particulate matter with a scrubbing solution. The scrubbing solution used will depend on the properties of the targeted component, and can include for example, water (e.g., for particulate matter) or solutions of reagents that specifically target a certain compound.

In a wet scrubber, the exhaust gas stream can be brought into contact with the scrubbing solution, for example, by: spraying the exhaust gas stream with the scrubbing solution, forcing the exhaust gas stream through a pool of the scrubbing solution, or by some other contact method. Removal efficiency of the target component can be improved by increasing residence time in the wet scrubber or by increasing the surface area of the scrubber solution (for example, by the use of a spray nozzle, packed towers, or an aspirator). The versatility of wet scrubbers allows them to be built in numerous configurations, which can be designed to provide good contact between the scrubbing liquid and exhaust gas stream. The resultant scrubbing liquid (e.g., with the target component captured therein) usually needs to be treated prior to any ultimate discharge or being reused.

Wet absorption processes (e.g., wet scrubbers) suffer from the common drawback of the exhaust gas being cooled substantially and becoming saturated with water. This cooling of the exhaust gas can decrease overall efficiency of the process because of the additional power requirements for dispersal of the exhaust gas to the atmosphere. Further, the associated condensation and precipitation of evaporated water containing contaminants in the surrounding environment, and the general formation of plumes at the point of emission from the plant stack, can create substantial problems. Also, in the case of $SO_2$ removal, difficulties can arise where economic and efficient recovery of the dissolved absorbent and sulfur values from aqueous solution is attempted. Furthermore, poorly maintained scrubbers (e.g., those that have not been adequately cleaned) have the potential to spread disease-causing bacteria. For example, the cause of a 2005 outbreak of Legionnaires' disease in Norway that caused 10 deaths and over 50 cases of infection, was traced to a few infected scrubbers.

Alternative methods for gas scrubbing, such as the wet sulfuric acid (WSA) system are less widely implemented in industrial and manufacturing systems due to the sensitivity of the operation to sulfur concentrations and particulate matter, but are typically found integrated in mining and power plant operations. WSA systems typically operate at sulfur oxide concentrations more than an order of magnitude greater than what is conventionally seen in the carbon black process for operational and economic reasons. Furthermore, the catalyst used in WSA systems for conversion of the sulfur oxides to sulfuric acid is extremely susceptible to deactivation by chemical poisoning, mechanical blockage, and thermal degradation from particulate matter in combusted exhaust gas streams. As such, all WSA systems, independent of the exact installation, integrate an electrostatic precipitator (ESP) to remove the particulate matter. The use of an ESP causes a significant loss in thermodynamic efficiency of the system—cooling of the gas stream for particulate removal followed by heating of the gas stream for catalytic conversion. In addition, the operational costs of an ESP (electricity, pressure drop, flow) can become cost prohibitive.

Wet scrubbers and conventional WSA systems are not recommended for removing $SO_2$ from exhaust gases from carbon black production processes. This is because exhaust gases from carbon black processes have low levels of sulfur and high levels of particulate matter and water. As such, economically and commercially viable methods and systems for scrubbing exhaust gases produced during carbon black production, which overcome or alleviate at least some of the afore-mentioned deficiencies of the existing solutions, are desired. The methods and systems discussed herein address these and other needs.

SUMMARY

In accordance with the purposes of the disclosed methods and systems, as embodied and broadly described herein, the disclosed subject matter relates to methods and systems for reducing particulate matter from a process exhaust gas, in particular exhaust gases that result from carbon black production processes. The disclosed subject matter further relates to methods and systems for reducing particulate matter in a carbon black process exhaust gas that is to be treated using a WSA process.

In some examples, the disclosed methods can comprise producing carbon black from a hydrocarbon in a carbon black process. In some examples, producing carbon black can comprise incomplete combustion of the hydrocarbon. In some examples, producing carbon black can comprise thermal decomposition of the hydrocarbon. Accordingly, also the exhaust gas can be produced from thermal decomposition of a hydrocarbon or incomplete combustion of a hydrocarbon. The exhaust gas obtained in a carbon black process may comprise one or more components capable of being oxidized, for example by combustion, and is accordingly referred to herein also as "reduced exhaust gas". Examples of suitable hydrocarbons include, but are not limited to, heavy distillate oils; heavy residual oils; vacuum distillate oils; heavy vacuum oils; fluidized catalytic cracker distillate oils; fluidized catalytic cracker residual oils; distillate, residual, or tar oils from coal gasification or distillation; distillate, residual, or tar oils from steam cracking or polymer reaction distillation processes; other sulfur-containing, condensable, hydrocarbon gases or residual heavy oils; distillate, fuel, or residual oils from biological or renewable sources; aromatic hydrocarbon oils, mineral oils, vegetable oils, natural gas, acetylene, or combinations thereof.

In some examples, the disclosed methods can further comprise collecting the carbon black. Collecting the carbon black can comprise, for example, filtering to separate the carbon black from the reduced exhaust gas.

In some examples, the reduced exhaust gas from the carbon black process can comprise particulate matter, a precursor of a sulfur oxide, a precursor of a nitrogen oxide, or combinations thereof. The reduced exhaust gas can comprise, for example, from 1 to 5,000 $mg/Nm^3$ of particulate matter. As used herein the unit "$mg/Nm^3$" designates the mass of particulate matter in milligram per unit volume of exhaust gas in cubic meter under standard (normal "N") conditions (101.325 kPa, 25° C.), if not indicated otherwise. The methods according to the present invention can further comprise, in some examples, removing at least a portion of the particulate matter from the reduced exhaust gas from the carbon black process.

According to the present disclosure reducing particulate matter from an exhaust gas from a carbon black process can in particular comprise combusting the exhaust gas to thereby produce a combusted exhaust gas comprising particulate matter; catalytically oxidizing at least a portion of the particulate matter, thereby removing at least a portion of the particulate matter from the combusted exhaust gas using a guard bed comprising an oxidation catalyst.

In some examples, the disclosed methods can thus utilize a reduced exhaust gas from a carbon black process. In the disclosed methods, the reduced exhaust gas from the carbon black process (module) can then be combusted to produce a combusted exhaust gas. The combusted exhaust gas can comprise particulate matter and optionally other materials like a sulfur oxide, a nitrogen oxide, or combinations thereof. In some examples, the combusted exhaust gas can comprise from 1 to 5,000 $mg/Nm^3$ of particulate matter.

In some examples, the disclosed methods can comprise removing at least a portion of the particulate matter from the combusted exhaust gas using an oxidation catalyst. The catalytic oxidation is carried out in the presence of a sufficient amount of excess oxygen. The oxidation catalyst can be in a guard bed, which can be a separate vessel connected to a WSA-reactor or a portion or stage of the WSA-reactor. The oxidation catalyst can be a catalyst such as those typically used in a WSA-process. Examples of suitable oxidation catalysts include, but are not limited to, vanadium, cobalt, molybdenum, manganese, sodium, potassium, cesium, platinum, palladium, iron, or combinations thereof. The guard bed can, in some examples, further comprise a thermally stable substrate upon which the oxidation catalyst can be supported. Examples of suitable thermally stable substrates include, but are not limited to, alumina, silica, chromia, zirconia, tungsten, diatomaceous earth, cordierite, or combinations thereof. In some examples, the guard bed can remove 90 wt. % or more of the particulate matter from the combusted exhaust gas, based on the total mass of particulate matter present in the combusted exhaust gas before the guard bed. In some examples, after at least a portion of the particulate matter has been removed from the combusted exhaust gas, the combusted exhaust gas can comprise 30 mg/Nm$^3$ or less of particulate matter. Due to such comparatively low concentration of particulate matter the combusted exhaust gas from which at least a portion of the particulate matter has been removed can be effectively treated in a WSA process.

Also disclosed herein are systems for reducing particulate matter from an exhaust gas of a carbon black process module. The disclosed systems can optionally comprise the carbon black process module. In some examples, the disclosed systems can comprise a combustion device configured to receive a reduced exhaust gas from a carbon black process module and combust the reduced exhaust gas to produce a combusted exhaust gas comprising particulate matter. As indicated already above, the combusted exhaust gas can further comprise—in addition to the particulate matter—for example a sulfur oxide, a nitrogen oxide, or combinations thereof. In some examples, the disclosed systems can further comprise a particulate matter removal device, such as a guard bed, configured to receive the combusted exhaust gas and remove by catalytic oxidation at least a portion of the particulate matter from the combusted exhaust gas. The disclosed systems can also comprise conduits through which the reduced exhaust gas is conveyed from the carbon black process module to the combustion device and from the combustion device to the particulate matter removal device (e.g., guard bed).

Additional advantages will be set forth in part in the description that follows or may be learned by practice of the aspects described below. The advantages described below will be realized and attained by elements and combinations particularly pointed out in the appended claims. It is to be understood that both the foregoing general description and the following detailed description are exemplary and explanatory only and are not restrictive.

DESCRIPTION OF FIGURES

The accompanying figures, which are incorporated in and constitute part of this specification, illustrate several aspects described below.

DETAILED DESCRIPTION

The methods and systems described herein may be understood more readily by reference to the following detailed description of specific aspects of the disclosed subject matter and the Examples and Figures included therein.

Before the present methods and systems are disclosed and described, it is to be understood that the aspects described below are not limited to specific methods or specific systems, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

All values provided as "ppmv" are defined as volume fractions with the order of parts per million, calculated to the reference condition at 0° C., water free, and oxygen free (0 Vol % $H_2O$ and $O_2$).

As used herein a "carbon black process" means any process for the production of carbon black (CB).

As used herein "WSA" or "wet sulfuric acid" process means any process where $SO_2$ is catalytically converted to $SO_3$ out of a wet gas stream and the $SO_3$ is removed in a subsequent step. This removal is done preferably, but not necessarily, as sulfuric acid by lowering to condensation temperature.

As used herein "WSA-catalyst" is any catalyst suitable to be used in a WSA process. These catalysts are commonly, but not necessarily, vanadium based catalysts on a porous, thermally stable carrier material. By adding further elements the active component melting temperature can be decreased, i.e., the operating temperature lowered. For example, a WSA-catalyst can be vanadium oxide with one or more optional metals like sodium, potassium, and cesium.

By "PM" or "particulate matter" is meant any material, independent of its nature or origin, that condenses at or above the filtration temperature used in characterization method EN13284 ("Stationary Source Emissions: Determination of Flow Range Mass Concentrations of Dust") on a dry basis. By "carbonaceous particulate matter" is meant particulate matter that contains primarily carbon, such as e.g., at least 90 wt. %, or at least 92 wt. %, or at least 94 wt. %, or at least 96 wt. %, or at least 98 wt. % carbon, based on the total mass of the particulate matter. The carbon content of the particulate matter can be determined by methods known in the art such by combustion elemental analysis.

By "spiking" is meant an artificial increase of a feed gas component to simulate process conditions. Spiking should focus on the proper mixing of the component added and the process gas and avoid the addition of additional components (impurities) to the system.

As used herein, "reduced exhaust gas" refers to an exhaust gas that is capable of being oxidized, for example by combustion.

Reference will now be made in detail to specific aspects of the disclosed materials, compounds, compositions, articles, and methods, examples of which are illustrated in the accompanying Examples and Figures.

Methods

Carbon Black Processes

Disclosed herein are methods of reducing the particulate matter content of an exhaust gas from a carbon black process. The methods disclosed herein can, for example, comprise producing carbon black and a reduced exhaust gas from a hydrocarbon in a carbon black process. The carbon black and reduced exhaust gas can be produced by any methods known in the art. The carbon black process can, for example, be carried out in a carbon black process module. Carbon black can be produced, for example, by incomplete combustion or thermal decomposition of gaseous or liquid hydrocarbons under controlled conditions. Incomplete combustion methods for carbon black production include, for example, oil furnace methods, lampblack methods, channel methods, and gas furnace methods. Thermal decomposition methods include, for example, acetylene decomposition methods and natural gas thermal decomposition methods. The reaction temperature and/or time can be adjusted to manufacture carbon black with different particle sizes and structures. These adjustments can also affect the composition of the reduced exhaust gas.

In some examples, producing carbon black can comprise incomplete combustion of a hydrocarbon. In some examples, producing carbon black can comprise thermal decomposition of a hydrocarbon. Examples of suitable hydrocarbons include, but are not limited to, heavy distillate oils; heavy residual oils; vacuum distillate oils; heavy vacuum oils; fluidized catalytic cracker distillate oils; fluidized catalytic cracker residual oils; distillate, residual, or tar oils from coal gasification or distillation; distillate, residual, or tar oils from steam cracking or polymer reaction distillation processes; other sulfur-containing, condensable, hydrocarbon gases or residual heavy oils; distillate, fuel, or residual oils from biological or renewable sources; or combinations thereof.

In some examples, the disclosed methods can further comprise collecting the carbon black. The carbon black can be collected by any methods known in the art. In some examples, collecting the carbon black can comprise filtering to separate the carbon black from the reduced exhaust gas. Examples of suitable filters can include, for example, bag filters and ceramic filters. According to the present invention collecting the carbon black can in particular be carried out prior to further treatment of the (separated) exhaust gas as set forth below.

Reduced Exhaust Gases

The reduced exhaust gas from a carbon black process generally comprises particulate matter. Additional components, which may further be comprised in the reduced exhaust gas, include, without being limited thereto, for example water, oxygen, carbon monoxide, carbon dioxide, a precursor for a nitrogen oxide such as nitrogen, ammonia and/or hydrogen cyanide, a precursor for a sulfur oxide such as carbonyl sulfide, carbon disulfide and/or hydrogen sulfide, sulfur dioxide, sulfur trioxide, nitrogen monoxide, nitrogen dioxide or combinations thereof. Hazardous air pollutants (HAP) emitted from the carbon black process (e.g., in the exhaust gas) can thus for example comprise reduced sulfur compounds. According to the U.S. Environmental Protection Agency, there are four primary HAPs emitted from the carbon black process: carbon disulfide, carbonyl sulfide, hydrogen sulfide, and hydrogen cyanide.

As used herein, the exhaust gas of a carbon black process can be referred to as a reduced exhaust gas and can contain, among other materials, particulate matter and a precursor of a sulfur oxide (e.g., carbon disulfide, carbonyl sulfide, and hydrogen sulfide).

In some examples, the reduced exhaust gas can comprise 1 mg/Nm$^3$ or more of particulate matter (e.g., 2 mg/Nm$^3$ or more; 3 mg/Nm$^3$ or more; 4 mg/Nm$^3$ or more; 5 mg/Nm$^3$ or more; 10 mg/Nm$^3$ or more; 20 mg/Nm$^3$ or more; 30 mg/Nm$^3$ or more; 40 mg/Nm$^3$ or more; 50 mg/Nm$^3$ or more; 100 mg/Nm$^3$ or more; 150 mg/Nm$^3$ or more; 200 mg/Nm$^3$ or more; 250 mg/Nm$^3$ or more; 300 mg/Nm$^3$ or more; 350 mg/Nm$^3$ or more; 400 mg/Nm$^3$ or more; 450 mg/Nm$^3$ or more; 500 mg/Nm$^3$ or more; 600 mg/Nm$^3$ or more; 700 mg/Nm$^3$ or more; 800 mg/Nm$^3$ or more; 900 mg/Nm$^3$ or more; 1,000 mg/Nm$^3$ or more; 1,500 mg/Nm$^3$ or more; 2,000 mg/Nm$^3$ or more; 2,500 mg/Nm$^3$ or more; 3,000 mg/Nm$^3$ or more; 3,500 mg/Nm$^3$ or more; 4,000 mg/Nm$^3$ or more; or 4,500 mg/Nm$^3$ or more). The reduced exhaust gas, in some examples, can comprise 5,000 mg/Nm$^3$ or less of particulate matter (e.g., 4,500 mg/Nm$^3$ or less; 4,000 mg/Nm$^3$ or less; 3,500 mg/Nm$^3$ or less; 3,000 mg/Nm$^3$ or less; 2,500 mg/Nm$^3$ or less; 2,000 mg/Nm$^3$ or less; 1,500 mg/Nm$^3$ or less; 1,000 mg/Nm$^3$ or less; 900 mg/Nm$^3$ or less; 800 mg/Nm$^3$ or less; 700 mg/Nm$^3$ or less; 600 mg/Nm$^3$ or less; 500 mg/Nm$^3$ or less; 450 mg/Nm$^3$ or less; 400 mg/Nm$^3$ or less; 350 mg/Nm$^3$ or less; 300 mg/Nm$^3$ or less; 250 mg/Nm$^3$ or less; 200 mg/Nm$^3$ or less; 150 mg/Nm$^3$ or less; 100 mg/Nm$^3$ or less; 50 mg/Nm$^3$ or less; 40 mg/Nm$^3$ or less; 30 mg/Nm$^3$ or less; 20 mg/Nm$^3$ or less; 10 mg/Nm$^3$ or less; 5 mg/Nm$^3$ or less; 4 mg/Nm$^3$ or less; 3 mg/Nm$^3$ or less; 2 mg/Nm$^3$ or less; or 1 mg/Nm$^3$ or less). The amount of particulate matter in the reduced exhaust gas can range from any of the minimum values described above to any of the maximum values described above. For example, the reduced exhaust gas can comprise from 1 to 5,000 mg/Nm$^3$ of particulate matter (e.g., from 1 mg/Nm$^3$ to 2,500 mg/Nm$^3$; from 2,500 mg/Nm$^3$ to 5,000 mg/Nm$^3$; from 1 mg/Nm$^3$ to 1,000 mg/Nm$^3$; from 1,000 mg/Nm$^3$ to 2,000 mg/Nm$^3$, from 2,000 mg/Nm$^3$ to 3,000 mg/Nm$^3$; from 3,000 mg/Nm$^3$ to 4,000 mg/Nm$^3$; from 4,000 mg/Nm$^3$ to 5,000 mg/Nm$^3$; or from 100 mg/Nm$^3$ to 4,000 mg/Nm$^3$). As used throughout, the amount of particulate matter in an exhaust gas can be determined using European Method EN13284 ("Stationary Source Emissions: Determination of Flow Range Mass Concentrations of Dust") on a dry basis. It should be understood that the values described herein for particulate matter can, in particular, be carbonaceous particulate matter such that the recited values apply analogously to carbonaceous particulate matter.

The disclosed methods can optionally comprise removing at least a portion of the particulate matter from the reduced exhaust gas before combustion. The at least a portion of the particulate matter can be removed from the reduced exhaust gas, for example, by mechanical filtration or other methods known in the art.

Combusted Exhaust Gases

In the disclosed methods, a reduced exhaust gas from a carbon black process can be combusted to produce a combusted exhaust gas. The combusted exhaust gas can comprise, among other materials, particulate matter, sulfur dioxide, and water. Combusting the reduced exhaust gas can, for example, convert the sulfur oxide precursors into sulfur oxides. In other words, in some examples, the combusted exhaust gas can comprise particulate matter, a sulfur oxide, water, or combinations thereof.

In some examples, the combusted exhaust gas can comprise 1 mg/Nm$^3$ or more of particulate matter (e.g., 2 mg/Nm$^3$ or more; 3 mg/Nm$^3$ or more; 4 mg/Nm$^3$ or more; 5 mg/Nm$^3$ or more; 10 mg/Nm$^3$ or more; 20 mg/Nm$^3$ or more; 30 mg/Nm$^3$ or more; 40 mg/Nm$^3$ or more; 50 mg/Nm$^3$ or more; 100 mg/Nm$^3$ or more; 150 mg/Nm$^3$ or more; 200 mg/Nm$^3$ or more; 250 mg/Nm$^3$ or more; 300 mg/Nm$^3$ or more; 350 mg/Nm$^3$ or more; 400 mg/Nm$^3$ or more; 450 mg/Nm$^3$ or more; 500 mg/Nm$^3$ or more; 600 mg/Nm$^3$ or more; 700 mg/Nm$^3$ or more; 800 mg/Nm$^3$ or more; 900 mg/Nm$^3$ or more; 1,000 mg/Nm$^3$ or more; 1,500 mg/Nm$^3$ or more; 2,000 mg/Nm$^3$ or more; 2,500 mg/Nm$^3$ or more; 3,000 mg/Nm$^3$ or more; 3,500 mg/Nm$^3$ or more; 4,000 mg/Nm$^3$ or more; or 4,500 mg/Nm$^3$ or more). The combusted exhaust gas, in some examples, can comprise 5,000 mg/Nm$^3$ or less of particulate matter (e.g., 4,500 mg/Nm$^3$ or less; 4,000 mg/Nm$^3$ or less; 3,500 mg/Nm$^3$ or less; 3,000 mg/Nm$^3$ or less; 2,500 mg/Nm$^3$ or less; 2,000 mg/Nm$^3$ or less; 1,500 mg/Nm$^3$ or less; 1,000 mg/Nm$^3$ or less; 900 mg/Nm$^3$ or less; 800 mg/Nm$^3$ or less; 700 mg/Nm$^3$ or less; 600 mg/Nm$^3$ or less; 500 mg/Nm$^3$ or less; 450 mg/Nm$^3$ or less; 400 mg/Nm$^3$ or less; 350 mg/Nm$^3$ or less; 300 mg/Nm$^3$ or less; 250 mg/Nm$^3$ or less; 200 mg/Nm$^3$ or less; 150 mg/Nm$^3$ or less; 100 mg/Nm$^3$ or less; 50 mg/Nm$^3$ or less; 40 mg/Nm$^3$ or less; 30 mg/Nm$^3$ or less; 20 mg/Nm$^3$ or less; 10 mg/Nm$^3$ or less; 5 mg/Nm$^3$ or less; 4 mg/Nm$^3$ or less; 3 mg/Nm$^3$ or less; 2 mg/Nm$^3$ or less; or 1 mg/Nm$^3$ or less). The amount of particulate matter in the combusted exhaust gas can range from any of the minimum values described above to any of the maximum values described above. For example, the combusted exhaust gas can comprise from 1 to 5,000 mg/Nm$^3$ of particulate matter (e.g., from 1 mg/Nm$^3$ to 2,500 mg/Nm$^3$; from 2,500 mg/Nm$^3$ to 5,000 mg/Nm$^3$; from 1 mg/Nm$^3$ to 1,000 mg/Nm$^3$; from 1,000 mg/Nm$^3$ to 2,000 mg/Nm$^3$, from 2,000 mg/Nm$^3$ to 3,000 mg/Nm$^3$; from 3,000 mg/Nm$^3$ to 4,000 mg/Nm$^3$; from 4,000 mg/Nm$^3$ to 5,000 mg/Nm$^3$; or from 100 mg/Nm$^3$ to 4,000 mg/Nm$^3$). As used throughout, the amount of particulate matter in an exhaust gas can be determined using characterization method EN13284 ("Stationary Source Emissions: Determination of Flow Range Mass Concentrations of Dust") on a dry basis.

In some examples, the combusted exhaust gas can comprise sulfur dioxide. The combusted exhaust gas can comprise, for example, 50 ppmv or more of sulfur dioxide (e.g., 50 ppmv or more, 100 ppmv or more, 150 ppmv or more, 200 ppmv or more; 250 ppmv or more; 300 ppmv or more; 350 ppmv or more; 400 ppmv or more; 450 ppmv or more; 500 ppmv or more; 600 ppmv or more; 700 ppmv or more; 800 ppmv or more; 900 ppmv or more; 1,000 ppmv or more; 1,500 ppmv or more; 2,000 ppmv or more; 2,500 ppmv or more; 3,000 ppmv or more; 3,500 ppmv or more; 4,000 ppmv or more; 4,500 ppmv or more; 5,000 ppmv or more; or 5,500 ppmv or more). In some examples, the combusted exhaust gas can comprise 6,000 ppmv or less of sulfur dioxide (e.g., 5,500 ppmv or less; 5,000 ppmv or less; 4,500 ppmv or less; 4,000 ppmv or less; 3,500 ppmv or less; 3,000 ppmv or less; 2,500 ppmv or less; 2,000 ppmv or less; 1,500 ppmv or less; 1,000 ppmv or less; 900 ppmv or less; 800 ppmv or less; 700 ppmv or less; 600 ppmv or less; 500 ppmv or less; 450 ppmv or less; 400 ppmv or less; 350 ppmv or less; 300 ppmv or less; 250 ppmv or less; 200 ppmv or less; 150 ppmv or less; or 100 ppmv or less).

The amount of sulfur dioxide in the combusted exhaust gas can range from any of the minimum values described above to any of the maximum values described above. For example, the combusted exhaust gas can comprise from 50 ppmv to 6,000 ppmv of sulfur dioxide (e.g., from 50 to 4000 ppmv; from 3,000 ppmv to 6,000 ppmv; from 50 ppmv to 1,000 ppmv; from 1,000 ppmv to 3,000 ppmv; from 100 ppmv to 3,000 ppmv; from 3,000 ppmv to 4,000 ppmv; from 200 ppmv to 2,000 ppmv; from 5,000 ppmv to 6,000 ppmv; or from 500 ppmv to 5,500 ppmv). In some examples, the amount of sulfur dioxide in the combusted exhaust gas can comprise from 50 to ppmv to 10 wt. %. For example, the combusted exhaust gas can comprise from 50 ppmv to 1000 ppmv, from 500 ppmv to 2000 ppmv, from 1 wt. % to 10 wt. %, from 2 wt. % to 6 wt. %, from 3 wt. % to 4 wt. %, or from 5 wt. % to 10 wt. % $SO_2$. As used throughout, the concentration of a component (in ppmv) in an exhaust gas is given on a dry basis at 0% $O_2$.

In some examples, the amount of water in the combusted exhaust gas can comprise from 10 wt. % to 50 wt. %, based on the total mass of the combusted exhaust gas. For example, the amount of water in the combusted exhaust gas can be from 10 wt. % to 25 wt. %, from 25 wt. % to 50 wt. %, from 20 wt. % to 40 wt. %, or from 30 wt. % to 50 wt. % water, based on the total mass of the combusted exhaust gas.

Oxidation Catalyst

In some examples, the disclosed methods can further comprise removing at least a portion of the particulate matter from the combusted exhaust gas using an oxidation catalyst. The catalytic oxidation can cause conversion of at least a portion of the carbonaceous particulate matter into gaseous matter thereby reducing the amount of particulate matter in the combusted exhaust gas. The oxidation catalyst can be such as those typically used in a WSA process. In the disclosed methods and systems the location of the oxidation catalyst can be found in what is termed a guard bed, which is any vessel or portion of the disclosed system that contains an oxidation catalyst for use in reducing the amount of particulate matter, such as in particular carbonaceous particulate matter, in the combusted exhaust gas. The guard bed can be a vessel that is separate from, though connected to, the WSA-reactor or an initial portion or stage of the WSA-reactor itself. In the disclosed methods, particulate matter, such as for example the carbonaceous particulate matter, can be removed from the combusted exhaust gas by passing the particulate matter through a guard bed (or oxidation catalyst, which may be comprised in the guard bed or may be provided in a different manner) and oxidizing at least a portion of the particulate matter to a gaseous product.

Also, in the disclosed methods and systems, it is not necessary to use an electrostatic precipitator (ESP) for reaching sufficiently low levels of particulate matter as required for treatment of the exhaust gas by a WSA process. Accordingly, an electrostatic precipitator (ESP) is typically not used to remove particulate matter at any stage of the process according to the present invention. This is an unexpected, and favorable, result as conventional WSA systems require an ESP to prevent catalyst deactivation. Like other manufacturing processes in which WSA systems have been used, the carbon black process produces exhaust gases that have high levels of carbonaceous particulate matter, and one would generally expect that such material needs to be removed with an ESP so that it will not interfere with the oxidation catalysts used downstream in the WSA process or otherwise affect the $SO_2$ conversion process. Unexpectedly, however, an oxidation catalyst, e.g. comprised in a guard bed, can be used in conjunction with the carbon black process, in part because a substantial fraction of the particulate matter produced in the carbon black process is carbonaceous particulate matter. Elimination of ESP through use of a guard bed provides a significant thermodynamic efficiency savings. For example, by eliminating excess cooling to reach the operational temperature of an ESP and reheating to reach the catalytic conversion temperature of the sulfur oxides, there can be a thermal efficiency improvement of at least 48%, which could be significantly greater depending on the methods and systems for heating and cooling of the gas stream. The improvement of thermal efficiency can be based on a comparison to a method in which substantially equivalent particulate matter reduction is achieved using an electrostatic precipitator. The disclosed methods can accordingly further comprise treating the combusted exhaust gas from which at least a portion of the particulate matter has been removed through catalytic oxidation in a WSA process. According to the disclosed methods, which do not need an ESP, the sulfur oxides can be removed in the wet sulfuric acid process without heating the combusted gas. Accordingly the sulfur oxides can be removed from the combusted gas with increased thermal efficiency as compared to a method in which substantially equivalent particulate matter reduction is achieved using an electrostatic precipitator.

The guard bed can comprise an oxidation catalyst and optionally a mechanical filtration material, inert filter, or a combination thereof. For oxidation catalysts, any WSA catalyst can be used, as well as any precious metal oxidation catalyst and any other oxidation catalyst on a substrate withstanding the process conditions. Examples of suitable oxidation catalysts include, but are not limited to, vanadium, cobalt, molybdenum, manganese, sodium, potassium, cesium, platinum, palladium, iron, or combinations thereof. These catalysts used in WSA processes are well known and commercially available. The guard bed can, in some examples, further comprise a thermally stable substrate upon which the oxidation catalyst can be supported. Examples of suitable thermally stable substrates include, but are not limited to, alumina, silica, chromia, zirconia, tungsten, diatomaceous earth, cordierite, or combinations thereof.

As specific examples, suitable oxidation catalysts can comprise diatomaceous earth carriers with vanadium salts as active component. (See WO2011128830 and WO2013182502, which are incorporated by reference herein in their entireties for their teachings of oxidation catalysts.) Other suitable catalysts use Rh as active center (see WO2007035949), silicic acid carriers (see EP0129903), ceramic foams with a washcoat (see WO2006018059), lanthanide based catalyst (see EP0947234). The oxidation catalysts also include catalytically active filters (WO2016037981, WO2016029926).

Inert filters of various types can be used in combination with the oxidation catalysts. (Examples of inert filters are disclosed in EP0369330, WO2008142353, and EP27495912, which are incorporated by reference herein in their entireties for their teachings of inert filters.)

The step of catalytically oxidizing at least a portion of the particulate matter to thereby remove at least a portion of the particulate matter from the combusted gas can be carried out at any temperature at which the catalyst is active such that at least a portion of the particulate matter is oxidized, requiring typically elevated (with respect to ambient conditions) temperatures. Such (elevated) temperature depends accordingly on the catalyst used. In some examples, the elevated temperature can be 200° C. or more (e.g., 220° C. or more, 240° C. or more, 260° C. or more, 280° C. or more, 300° C. or more, 320° C. or more, 340° C. or more, 360° C. or more, 380° C. or more, 400° C. or more, 420° C. or more, 440° C. or more, 460° C. or more, 480° C. or more, 500° C. or more, 520° C. or more, 540° C. or more, 560° C. or more, or 580° C. or more). In some examples, the elevated temperature can be 600° C. or less (e.g., 580° C. or less, 560° C. or less, 540° C. or less, 520° C. or less, 500° C. or less, 480° C. or less, 460° C. or less, 440° C. or less, 420° C. or less, 400° C. or less, 380° C. or less, 360° C. or less, 340° C. or less, 320° C. or less, 300° C. or less, 280° C. or less, 260° C. or less, 240° C. or less, or 220° C. or less).

The elevated temperature can range from any of the minimum values described above to any of the maximum values described above. For example, the elevated temperature can range from 200° C. to 600° C. (e.g., from 200° C. to 400° C., from 400° C. to 600° C., from 200° C. to 280° C., from 280° C. to 360° C., from 360° C. to 440° C., from 440° C. to 520° C., from 520° C. to 600° C., from 360° C. to 600° C., from 400° C. to 550° C., or from 410° C. to 450° C.).

Accordingly, the reaction at the guard bed can be carried out in a temperature range where the oxidation catalyst is active. For vanadium based WSA catalysts, this lower limit is given by the ignition temperature, which can be as low as 300° C. Industrial WSA catalysts typically operate from 400 to 600° C., occasionally lower or higher. In some examples, the reaction at the guard bed is at from 400, 450, 500, 550, or 600° C., where any of the stated values can form the upper or lower endpoint of a range.

The reaction at the guard bed can be carried out in the presence of oxygen. The amount oxygen can be in excess as compared to the PM. Sources of oxygen are known to the skilled artisan and include air, $O_2$, water, and others.

In some examples, the guard bed can remove 90 wt. % or more of the particulate matter from the combusted exhaust gas (e.g., 90.5 wt. % or more, 91 wt. % or more, 91.5 wt. % or more, 92 wt. % or more, 92.5 wt. % or more, 93 wt. % or more, 93.5 wt. % or more, 94 wt. % or more, 94.5 wt. % or more, 95 wt. % or more, 95.5 wt. % or more, 96 wt. % or more, 96.5 wt. % or more, 97 wt. % or more, 97.5 wt. % or more, 98 wt. % or more, 98.5 wt. % or more, 99 wt. % or more, or 99.5 wt. % or more), based on the total mass of particulate matter present in the combusted exhaust gas before the guard bed. In some examples, the guard bed can remove 100 wt. % or less of the particulate matter from the combusted exhaust gas (e.g., 99.5 wt. % or less, 99 wt. % or less, 98.5 wt. % or less, 98 wt. % or less, 97.5 wt. % or less, 97 wt. % or less, 96.5 wt. % or less, 96 wt. % or less, 95.5 wt. % or less, 95 wt. % or less, 94.5 wt. % or less, 94 wt. % or less, 93.5 wt. % or less, 93 wt. % or less, 92.5 wt. % or less, 92 wt. % or less, 91.5 wt. % or less, 91 wt. % or less, or 90.5 wt. % or less), based on the total mass of particulate matter present in the combusted exhaust gas before the guard bed.

The amount of particulate matter removed by the guard bed can range from any of the minimum values described above to any of the maximum values described above. For example, the guard bed can remove from 90 wt. % to 100 wt. % of the particulate matter from the combusted exhaust gas (e.g., from 90 wt. % to 95 wt. %, from 95 wt. % to 100 wt. %, from 90 wt. % to 92 wt. %, from 92 wt. % to 94 wt. %, from 94 wt. % to 96 wt. %, from 96 wt. % to 98 wt. %, from 98 wt. % to 100 wt. %, from 99 wt. % to 100 wt. %, or from 93 wt. % to 97 wt. %), based on the total mass of particulate matter present in the combusted exhaust gas before the guard bed. In some examples, the guard bed can remove substantially all of the particulate matter from the combusted exhaust gas, for example 99 wt. % or more (e.g., 99.1 wt. % or more, 99.2 wt. % or more, 99.3 wt. % or more, 99.4 wt. % or more, 99.5 wt. % or more, 99.6 wt. % or more, 99.7 wt. % or more, 99.8 wt. % or more, or 99.9 wt. % or more), based on the total mass of particulate matter present in the combusted exhaust gas before the guard bed.

In some examples, after at least a portion of the particulate matter has been removed from the combusted exhaust gas, the combusted exhaust gas can comprise 30 mg/Nm$^3$ or less of particulate matter (e.g., 28 mg/Nm$^3$ or less, 26 mg/Nm$^3$ or less, 24 mg/Nm$^3$ or less, 22 mg/Nm$^3$ or less, 20 mg/Nm$^3$ or less, 18 mg/Nm$^3$ or less, 16 mg/Nm$^3$ or less, 14 mg/Nm$^3$ or less, 12 mg/Nm$^3$ or less, 10 mg/Nm$^3$ or less, 9 mg/Nm$^3$ or less, 8 mg/Nm$^3$ or less, 7 mg/Nm$^3$ or less, 6 mg/Nm$^3$ or less, 5 mg/Nm$^3$ or less, 4 mg/Nm$^3$ or less, 3 mg/Nm$^3$ or less, 2 mg/Nm$^3$ or less, or 1 mg/Nm$^3$ or less). In some examples, after at least a portion of the particulate matter has been removed from the combusted exhaust gas, the combusted exhaust gas can comprise 0 mg/Nm$^3$ or more of particulate matter (e.g., greater than 0 mg/Nm$^3$ or more, or, 1 mg/Nm$^3$ or more, 2 mg/Nm$^3$ or more, 3 mg/Nm$^3$ or more, 4 mg/Nm$^3$ or more, 5 mg/Nm$^3$ or more, 6 mg/Nm$^3$ or more, 7 mg/Nm$^3$ or more, 8 mg/Nm$^3$ or more, 9 mg/Nm$^3$ or more, 10 mg/Nm$^3$ or more, 12 mg/Nm$^3$ or more, 14 mg/Nm$^3$ or more, 16 mg/Nm$^3$ or more, 18 mg/Nm$^3$ or more, 20 mg/Nm$^3$ or more, 22 mg/Nm$^3$ or more, 24 mg/Nm$^3$ or more, 26 mg/Nm$^3$ or more, or 28 mg/Nm$^3$ or more).

The amount of particulate matter remaining in the combusted exhaust gas after at least a portion of the particulate matter has been removed from the combusted exhaust gas can range from any of the minimum values described above to any of the maximum values described above. For example, after at least a portion of the particulate matter has been removed from the combusted exhaust gas, the combusted exhaust gas can comprise from 0 mg/Nm$^3$ to 30 mg/Nm$^3$ of particulate matter (e.g. from 0 mg/Nm$^3$ to 14 mg/Nm$^3$, from 14 mg/Nm$^3$ to 30 mg/Nm$^3$, from 0 mg/Nm$^3$ to 6 mg/Nm$^3$, from 6 mg/Nm$^3$ to 12 mg/Nm$^3$, from 12 mg/Nm$^3$ to 18 mg/Nm$^3$, from 18 mg/Nm$^3$ to 24 mg/Nm$^3$, from 24 mg/Nm$^3$ to 30 mg/Nm$^3$, or from 2 mg/Nm$^3$ to 28 mg/Nm$^3$). As used throughout, the amount of particulate matter in an exhaust gas can be determined using characterization method EN13284 ("Stationary Source Emissions: Determination of Flow Range Mass Concentrations of Dust") on a dry basis.

Systems

Also disclosed herein are systems on which the methods disclosed herein can be carried out. For example, also disclosed herein are systems for reducing the amount of particulate matter from of an exhaust gas from a carbon black process module. For example, the disclosed systems can remove at least a portion of the particulate matter from a combusted exhaust gas from a carbon black process module.

Figure 1:
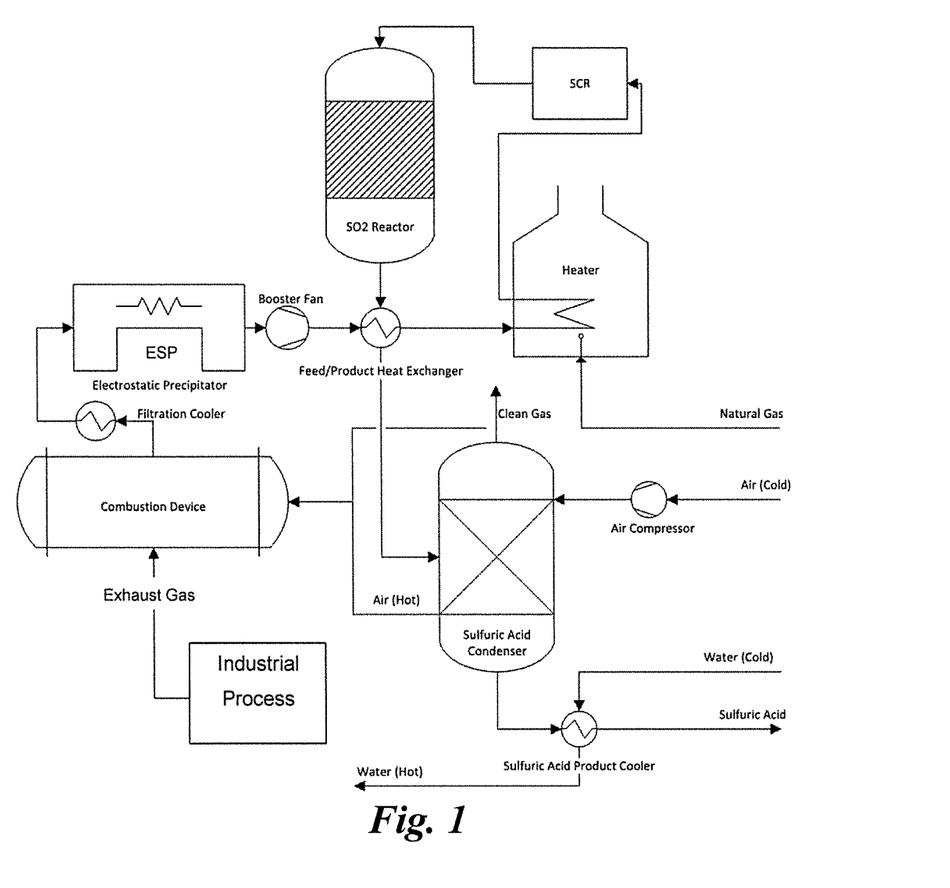
FIG. 1 displays a schematic of a standard wet sulfuric acid (WSA) SNOX process. The electrostatic precipitator (ESP) is shown.

Exhaust gas treatment including a wet sulfuric acid process (WSA) has been described in the art for removing NO$_x$ and SO$_x$ (also referred to as SNO$_x$ removal). Sulfur oxides (SO$_x$) can be from combusted flue gases, for example, by combusting reduced exhaust gases. SO$_x$ removal can be accomplished by an oxidation catalyst that utilizes excess oxygen and moisture in the flue gas to convert SO$_2$ to SO$_3$ that forms gaseous sulfuric acid which is then condensed out. A general schematic of a WSA process (or SNO$_x$ process) is shown in FIG. 1.

Such WSA process has certain advantages for use in carbon black production because it does not require an absorbent or subsequent disposal of spent absorbent, instead it creates a saleable byproduct (e.g., sulfuric acid). However, the high capital cost of the equipment, including the electrostatic precipitator, has prevented adoption of this WSA process and technology.

Figure 2:
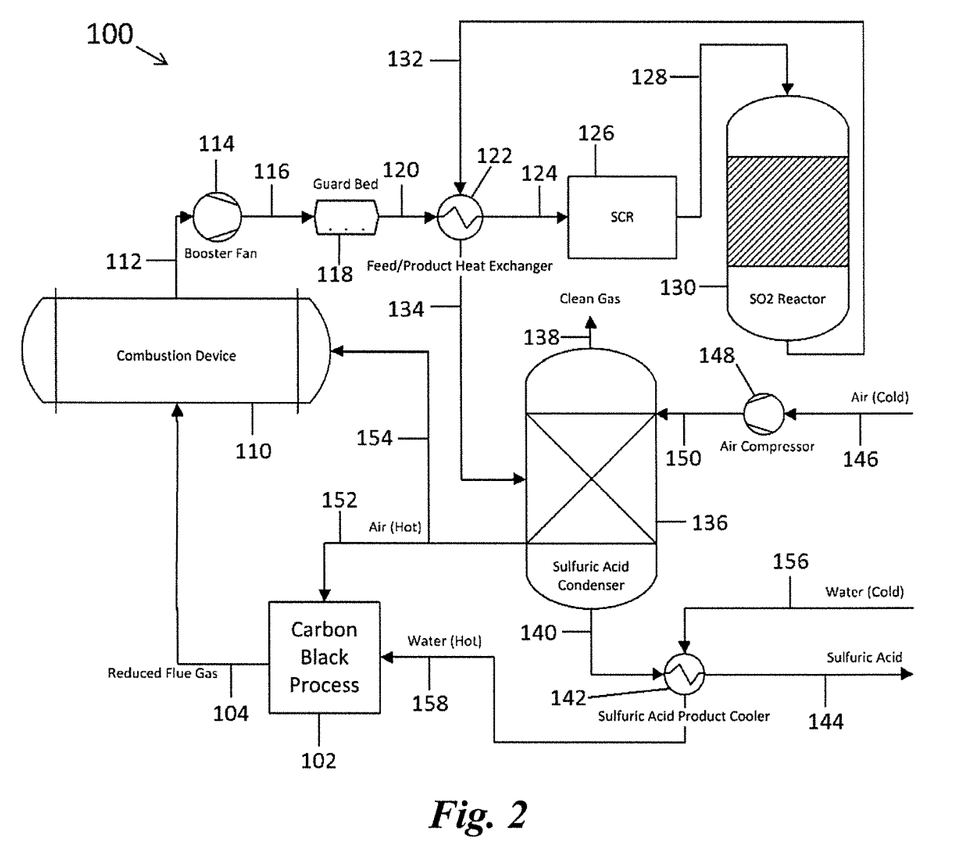
FIG. 2 displays a schematic block diagram of an exemplary system described herein.
Figure 3:
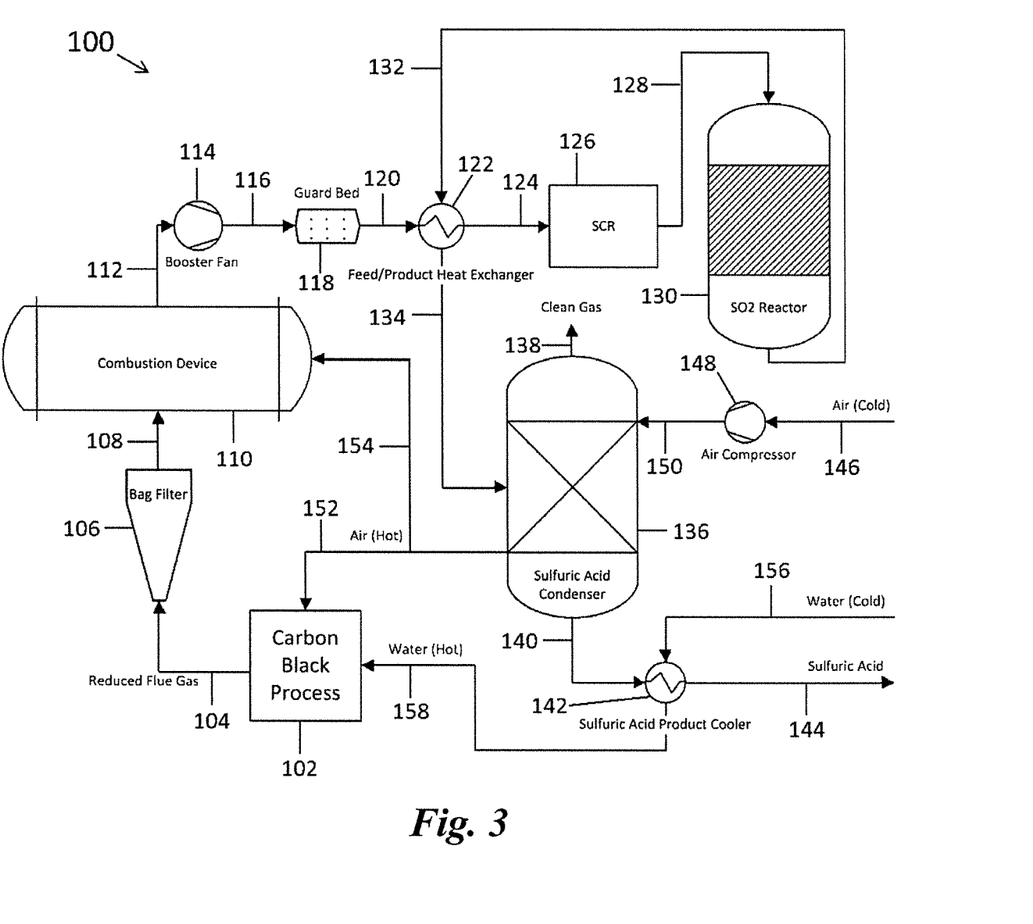
FIG. 3 displays a schematic block diagram on another exemplary system described herein.

According to the disclosed methods and systems, effective PM control can be achieved without the need for an electrostatic precipitator. Exemplary WSA systems for use with the methods disclosed herein are shown in FIGS. 2 and 3. In these systems, some, if not all, of the PM removal, and the thermal inefficiencies associated with operating the PM removal, can be significantly reduced or eliminated.

Referring now to FIGS. 2 and 3, in some examples, the system 100 can comprise a carbon black process module 102 configured to produce carbon black and a reduced exhaust gas. The carbon black process module 102 can comprise any means for producing carbon black known in the art. In some examples, the system 100 can further comprise a filter to separate the carbon black from the reduced exhaust gas. In some examples, the reduced exhaust gas can comprise, among other materials, a particulate matter and a precursor of a sulfur oxide. In some examples, as shown in FIG. 3, the system 100 can further comprise a conventional particulate matter removal device, such as a filter 106, configured to receive the reduced exhaust gas and remove at least a portion of the particulate matter from the reduced exhaust gas. The filter 106 can also be omitted from the system 100 as shown in FIG. 2. In some examples, the carbon black process module 102 can further comprise, for example, a dryer, a pelletizer, or any other known components for producing and collecting a finished carbon black product.

In some exemplary systems, the system 100 can further comprise a combustion device 110 configured to receive the reduced exhaust gas and combust the reduced exhaust gas to produce a combusted exhaust gas. The combusted exhaust gas can comprise, among other materials, sulfur dioxide and particulate matter. In some examples, the system 100 can further comprise a means for directing the reduced exhaust gas from the carbon black process module 102 to the combustion device 110. For example, the system 100 can comprise a conduit 104 configured to direct the reduced exhaust gas from the carbon black process module 102 to the filter 106, and a conduit 108 configured to direct the filtered reduced exhaust gas from the filter 106 to the combustion device 110. Alternatively, if no filter 106 is used, a conduit 104 will direct reduced exhaust gas from the carbon black process module 102 to the combustion device.

The combusted exhaust gas can comprise a particulate matter and a sulfur oxide. In some examples, the system 100 can further comprise a particulate matter removal device, such as a guard bed 118 configured to receive the combusted exhaust gas and remove at least a portion of the particulate matter from the combusted exhaust gas by catalytic oxidation. The system can comprise an oxidation catalyst, which may for example be comprised in the guard bed 118 or be provided in a different manner. Optionally the oxidation catalyst can be supported on a thermally stable substrate. Suitable exemplary oxidation catalysts and thermally stable substrates, which can be used in the systems according to the present invention, are described above in the context of the methods according to the present invention. In some examples, the system 100 can further comprise a means for directing the combusted exhaust gas from the combustion device 110 to the guard bed 118. For example, the system 100 can comprise a conduit 112 configured to direct the combusted exhaust gas from the combustion device 110 to a fan 114, which can be configured to direct the combusted exhaust gas through a conduit 116 to the guard bed 118.

In some examples, the system 100 can further comprise a nitrogen dioxide reduction process element 126 to remove at least a portion of the nitrogen dioxide from the combusted exhaust gas. In some examples, the system 100 can further comprise a means for directing the combusted exhaust gas from the guard bed 118 to the nitrogen dioxide reduction process element 126. For example, the system can further comprise a conduit 120 configured to direct the combusted exhaust gas from the guard bed 118 to a heat exchanger 122, and a conduit 124 to direct the combusted exhaust gas from the heat exchanger to the nitrogen dioxide reduction process element 126.

In some examples, the system 100 can further comprise a reactor 130 configured to: receive the combusted exhaust gas; oxidize at least a portion of the sulfur dioxide in the combusted exhaust gas to sulfur trioxide to produce a sulfur trioxide-rich exhaust gas; thereby removing at least a portion of the sulfur dioxide from the combusted exhaust gas. The reactor 130, for example, can comprise a catalyst configured to oxidize at least a portion of the sulfur dioxide in the combusted exhaust gas with oxygen at an elevated temperature. In some examples, the system 100 can further comprise a means for directing the combusted exhaust gas to the reactor 130. For example, the system can further comprise a conduit 128 for directing the combusted exhaust gas from the nitrogen dioxide reduction process element 126 to the reactor 130.

In some examples, the reactor 130 can further be configured to react the sulfur trioxide-rich exhaust gas with water to produce a sulfuric acid-rich exhaust gas. In some examples, the system 100 can further comprise a condenser 136 configured to receive the sulfuric acid-rich exhaust gas and condense the sulfuric acid from the sulfuric acid-rich exhaust gas to produce a purified exhaust gas and condensed sulfuric acid. In some examples, the system 100 can further comprise a means for directing the sulfuric acid-rich exhaust gas to the condenser 136. For example, the system 100 can comprise a conduit 132 configured to direct the sulfuric acid-rich exhaust gas from the reactor 130 to a heat exchanger 122, and a conduit 134 configured to direct the sulfuric acid-rich exhaust gas from the heat exchanger 122 to the condenser 136.

The condenser can, for example, be configured to decrease the temperature of the sulfuric acid-rich exhaust gas to a condensation temperature, thereby condensing the sulfuric acid. In some examples, the condenser 136 can be configured to receive cold air and/or water to decrease the temperature of the sulfuric acid-rich exhaust gas and output (or produce) hot air and/or steam. For example, the system 100 can comprise a conduit 146 configured to direct cold air to an air compressor 148, and a conduit 150 configured to direct the cold air from the air compressor 148 to the condenser 136. In some examples, the carbon black process module 102 and/or the combustion device 110 can be configured to receive the hot air from the condenser 136. In some examples, the system 100 can further comprise a means for directing the hot air from the condenser 136 to the carbon black process module 102 and/or the combustion device 110. For example, the system 100 can comprise a conduit 152 configured to direct the hot air from the condenser 136 to the carbon black process module 152 and/or a conduit 154 configured to direct the hot air from the condenser 136 to the combustion device 110.

In some examples, the system 100 can further comprise a means for directing the purified exhaust gas out of the condenser 136. For example, the system 100 can further comprise a conduit 138 configured to direct the purified exhaust gas out of the condenser 136.

In some examples, the system 100 can further comprise a means for collecting the condensed sulfuric acid. For example, the system 100 can further comprise a sulfuric acid product cooler (e.g., a heat exchanger) 142 configured to receive the condensed sulfuric acid from the condenser. In some examples, the system 100 can further comprise a means for directing the condensed sulfuric acid from the condenser 136 to the sulfuric acid product cooler 142. For example, the system can further comprise a conduit 140 configured to direct the condenser sulfuric acid from the condenser 136 to a sulfuric acid product cooler (e.g., a heat exchanger) 142. In some examples, the sulfuric acid product cooler 142 can be configured to receive cold water, for example from a conduit 156, and output hot water (e.g., by a conduit 158) and cooled sulfuric acid (e.g., by a conduit 144). In some examples, the carbon black process module 102 can be configured to receive the hot water from the sulfuric acid product cooler 142. For example, the system 100 can further comprise a conduit 158 configured to direct hot water from the sulfuric acid product cooler 142 to the carbon black process module 102.

In some examples, PM control can thus be accomplished by including after combustion a catalytic guard bed system prior to the $SO_2$ conversion catalyst. For example, a guard bed with an oxidation catalyst layer (V, Co, Mo, Mn, K, Cs, Pt, Pd, Fe, etc.) supported on a thermally stable substrate ($Al_2O_3$, $SiO_2$, $Cr_2O_3$, $ZrO_2$, W, etc.) can be used to oxidize much of the PM, including carbonaceous PM, in the combusted exhaust gas. The guard bed may optionally comprise a mechanical filtration material and/or inter filler. Optionally prior to combustion of the reduced exhaust gas (e.g., the reduced flue gas) conventional means for PM removal (mechanical filtration, electrostatic filtration, etc.) can be foreseen in addition.

Some advantages of the systems and methods according to the present invention are: little to no additional water is needed; little to no wastewater is generated; the potential for energy recovery is higher than in some other scrubbing operations; and the advantages of a modular system (e.g., the WSA reactor and condenser equipment) are retained. The systems and methods discussed herein can avoid at least a portion of the capital and operating cost barrier associated with the conventional WSA process. Furthermore, the systems and methods discussed herein can have opportunities for integrated energy recovery, for example by moving the boiler economizer to replace the oxidation reactor product heat exchanger, and/or integrating the hot air from the sulfuric acid condenser or directly into the carbon black process.

The economic advantages of the system discussed herein can be determined, to some degree, by the size and sulfur content of the exhaust gas stream being treated. The application of the technology could result in operating cost advantages over a conventional scrubbing system. With the reduction of the capital cost envisioned here, the capital cost of an effective $SO_x$ abatement system may be lower than the conventional scrubber systems. The methods and systems discussed herein can be economically advantageous over the other scrubbing technologies currently used in the carbon black industry.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the purity and yield obtained from the described process.

Experimental Set Up:
Catalysts

A total of four different daisy shaped catalysts from three global suppliers were evaluated. The details of each catalyst (average values) is summarized in Table 1.

TABLE 1

|  |  | catalyst I | catalyst II | catalyst III | catalyst VI |
|---|---|---|---|---|---|
| active element |  |  | vanadium |  |  |
| promotors |  | Na, K | Na, K, Cs | Na, K | Na, K |
| support |  |  | diatomaceous earth |  |  |
| length | mm | 14 | 10 | 22 | 14 |
| diameter | mm | 12 | 7 | 10 | 12.5 |
| center hole | mm | 6 | 3 | 6 | 3.5 |

Split Stream Unit

All experiments were carried out in a slip stream unit, connected to the exit of the selective (nitrogen oxides) catalytic reduction S(N)CR of an industrial carbon black plant by a centered sample gun. Upstream the S(N)CR the gas is combusted in a boiler and downstream of it sent to the stack. A typical composition of the combusted gas stream sent to the stack was 35-45 Vol % $H_2O$, 0.5-3 Vol % $O_2$, ≤100 ppmv $NO_x$, 50-400 ppmv $SO_2$, <15 Vol % $CO_2$ and ≤10 mg/$Nm^3$ PM.

The extracted gas flow for the slip stream testing was controlled by a mass flow meter (20-60 $Nm^3$/h, resulting in gas velocities of 0.59-1.78 m/s inside the guard bed and reactor) and fed through an electrical heating system to adjust temperature (350-600° C.) independently of the S(N) CR. In a next step, the option to spike PM and/or $SO_2$ and/or air ($O_2$ content) was installed. The $SO_2$ spiking was done by a 50% $SO_2$ in $N_2$ gas bottle and a mass flow controlled fixed flow rate. Therefore a fixed amount of $SO_2$ can be spiked and the typical fluctuations (50-400 ppmv) are not compensated. The PM was typically spiked as atomized dispersion with 500 mL/h added and an atomizing air flow of 1 $Nm^3$/h air. Also various carbon black (CB) were added as solid, using a semi-continuous dosing with approximately 0.5 mg added every 2-60 seconds and a control of the total amount dosed. After several meters of piping, making sure the gas was well mixed after the spiking, the gas was fed in the top-down reactor with a $SO_2$ probe for the inlet concentration. The first segment ($d_i$=109.1, h=300 mm) is the guard bed, followed by a sample probe for $SO_2$ measurement. The reactor had three segments (each $d_i$=109.1, h=450 mm), allowing precise determination of length profile of spent catalysts. A third $SO_2$ probe was installed at the exit of the reactor. The guard bed and reactor were electrically heated to reaction temperature, preventing heating loss. The differential pressure across the guard bed and each reactor segment was measured, as well as the differential pressure over the guard bed and reactor, e.g., catalyst filled sections of the unit. The gas was fed through a condenser, then into a side channel blower and finally into a stack.

Kinetic Testing

Kinetic testing was carried out by mixing air with $SO_2$ (both controlled by mass flow meters), feeding the mixture through a gas mixer, preheating in a heated hose and feeding into a metal reactor, mounted in a split tube furnace. The $SO_2$ was measured at the exit of the reactor, as well as at the inlet. With testing a variety of different catalysts the reactor was filled with a consistent mass of catalyst and inert sand is used to minimize wall flow effects. Typical operating conditions were:

inlet flow air 2.5 Nl/min
inlet flow 2 Vol % $SO_2$ in $N_2$ 0.075 Nl/min
temperature heating hose 450° C.
temperature split tube furnace 500° C.
catalyst mass 22.5 g
inner diameter of reactor pipe 20 mm It has been validated that the testing was carried out without transport limitation, and channeling flow was prevented by inert filler material. All experiments have been carried out until reaching equilibrium. In addition, a regular reference measurement with fresh catalyst I was performed, validating the stability of the testing.

Example 1

The first example evaluated whether there is pressure build up or poisoning of the catalyst when running at PM being multiple times higher than the <1 mg/$Nm^3$ typically achieved after PM is removed from a combusted exhaust gas using electrostatic precipitation (ESP).

The first trial (1-A) was carried out with catalyst IV and a flow rate of 60 $Nm^3$/h, which is approximately a three times higher gas velocity inside the reactor than in commercial WSA plants and therefore intentionally overemphasizing possible negative effects of the PM. The operating conditions where:

$SO_2$ 50-500 ppmv, with an average of 225 ppmv
$H_2O$>30 Vol %
$O_2$ commonly around 1.2 Vol %
PM<0.1 $g_{PM}$/$kg_{catalyst}$h
reactor temperature (gas phase) 420° C.

It was found that even after 28 days of operation neither the differential pressure of the guard bed (4.5 mbar), nor that over the reactor (12 mbar) increased. Subsequent kinetic testing of several samples across the length of the guard bed and across the reactor showed no significant difference to the fresh sample. The example shows that the CB based PM is oxidized by the catalyst in the guard bed as there is no pressure build up. Moreover, the example shows that this combustion does not thermally impact the catalyst, nor is the catalyst poisoned due to heavy metals originating in the feed oil (as shown by kinetic testing). Unexpectedly, the catalyst in the guard bed was not poised as one might not expect due to heavy metals in the feed oils.

The second trial (I-B) was a repeat, but using catalyst I and running 42 days. The process parameters were as follows:

$SO_2$ 50-500 ppmv, with an average of 215 ppmv
$H_2O$>35 Vol %
$O_2$ commonly around 2.5 Vol %
PM<0.1 $g_{PM}$/$kg_{catalyst}$ h
reactor temperature (gas phase) 395° C.

Once more neither an increase in differential pressure (guard bed 2 mbar, reactor 12.5 mbar), nor a loss in activity at various spots across the length of guard bed and reactor was observed.

Example 2

These examples show the impact of the $SO_2$ level on the conversion of the $SO_2$.

The $SO_2$ conversion at comparable process conditions (30 $Nm^3/h$ flow, $H_2O \gg 30$ Vol %, $O_2 \gg 1$ Vol %, 101 catalyst, $T_{reaction}=395°$ C., PM load<0.15 $g_{PM}/kg_{catalyst}h$]) but varying $SO_2$ levels is as in Table 2.

TABLE 2

| catalyst | $SO_2$ inlet [ppmv] | $SO_2$ reactor outlet [ppmv] | $SO_2$ conversion [rel. %] |
|---|---|---|---|
| I | 96 | 24 | 75 |
| I | 150 | 15 | 90 |
| I | 310 | 9 | 97 |
| I | 735 | 22 | 97 |
| I | 1950 | 58 | 97 |
| II | 160 | 7.3 | 95 |
| II | 1200 | 38 | 97 |

These measurements validate that a common WSA catalyst is also active at process conditions typical for a CB plant. No test at higher $SO_2$ loads (single digit percentage range) was carried out because the catalyst will be at least as active as at low $SO_2$ levels, as long as the oxygen content is sufficiently high and the $SO_2$ levels do not exceed typical WSA levels.

The experiments also indicate that at very low $SO_2$ levels the choice of catalyst can impact the conversion significantly.

Examples 1 and 2 demonstrate that there is no (significant) difference in conversion using a guard bed compared to a WSA process using electrostatic precipitator.

Example 3

Having shown that a guard bed can protect a conventional WSA process from poisoning by high levels of PM, the robustness of the process was demonstrated. The biggest threat for the guard bed/catalyst system would be an increase in the PM load, either by boiler operation or by a filter breach. To simulate these failure mode operations additional CB was spiked to the system, increasing the PM up to 500 $mg/Nm^3$ for several hours. With a failure mode operation lasting only minutes this testing was intentionally overemphasizing the PM load, targeting to demonstrate the robustness of the system.

Trial 3-A was carried out with catalyst I, the $SO_2$ inlet varying between 700-1100 ppmv and the gas flow kept constant at 30 $Nm^3/h$. Each step was applied for at least 3 h and a total of 278 g CB was added during the testing (Table 3).

TABLE 3

| PM load [$g_{PM}/kg_{catalyst}h$] | PM spiking [$mg/Nm^3$] | $dp_{guard+reactor}$ [mbar] | $SO_2$ outlet [ppmv] |
|---|---|---|---|
| <0.15 | 0 | 13.9 | 22 |
| 0.27 | 50 | 14.2 | 22 |
| 0.53 | 100 | 14.4 | 26 |
| 0.79 | 150 | 16.7 | 24 |

TABLE 3-continued

| PM load [$g_{PM}/kg_{catalyst}h$] | PM spiking [$mg/Nm^3$] | $dp_{guard+reactor}$ [mbar] | $SO_2$ outlet [ppmv] |
|---|---|---|---|
| 1.06 | 200 | 17.2 | 26 |
| 1.32 | 250 | 16.6 | 25 |
| 1.58 | 300 | 17.3 | 30 |

While the differential pressure increased slightly with increased levels of PM, continuously dosing equilibrium between adding new PM and oxidizing deposited PM was established. The data show that the delta pressure steps up a little with each PM level after a few minutes dosing, but stays at this level for the remaining time of spiking at this level. This was validated by repeatedly adding a certain level PM and stopping the dosing. It is shown that the differential pressures was changing between the initial value (no PM spiking) and the slightly higher value during the spiking. The insignificant reduction in conversion with increasing PM load is likely based on the fact that the guard bed is catalytically active (same catalyst material like in the reactors) and that the oxidation of the PM is competing with the $SO_2$ oxidation. On the other hand, the oxygen level was rather low in the experiments. In an industrial application the oxygen level would be controlled after the guard bed by adding hot air, validating that the conversion in the reactor is not limited.

Experiment 3-B used catalyst II, with $SO_2$ inlet varying from around 1100 ppmv, a constant total gas flow of 20 $Nm^3/h$, $O_2 \geq 1.5$ Vol %, $H_2O \geq 40$ Vol % and each dosing step lasting for approximately 5 h. Note that, in total, less catalyst has been filled into the reactor to emphasize potential changes in the conversion. The totally added CB was 130 g (Table 4).

TABLE 4

| PM load [$g_{PM}/kg_{catalyst}h$] | PM spiking [$mg/Nm^3$] | $dp_{guard+reactor}$ [mbar] | $SO_2$ outlet [ppmv] |
|---|---|---|---|
| <0.15 | 0 | 15.5 ± 0.5 | 35 |
| 1.42 | 150 | 15.5 ± 0.5 | 35 |
| 1.90 | 200 | 15.5 ± 0.5 | 35 |
| 2.85 | 300 | 15.5 ± 0.5 | 35 |
| 4.75 | 500 | 15.5 ± 0.5 | 35 |

The benefit of the high activity catalyst II (Cs promoted) compared to catalyst I is evident with respect to oxidizing efficiency for CB. Even at unrealistically high PM loads the guard bed can oxidize the PM with no significant increase in differential pressure.

Kinetic testing of the catalyst and guard bed samples from trial 3-A and 3-B showed no significant difference to the fresh reference catalyst of the same type.

Example 4

The capability of various guard beds to lower the PM was tested with different materials. The mechanical metal filters are the weakest in terms of efficiency. Beside the material selection, the choice of the mesh size can be complicated. Too big and the filter is not efficient, too low and the filter blocks in minutes, even under normal operations. Adsorber material is an option, which can operate for rather long time without delta pressure increase. They are hardly suitable in malfunction scenarios where the chance of blocking is high. The precious metal based, catalytically active, monolithic filter was not blocking, even though the channels of the monolith were in the mm range. The carbonaceous material was burned off effectively by the precious metals, favored by the sufficiently high temperature of the gas stream (>400° C.). A variety of commercial daisy shaped WSA catalysts was greatly reducing the PM load, with significant differences in efficiency. PM measurements have been performed according to EN13284. Efficiency data is in Table 5.

TABLE 5

| guard bed material | PM removal efficiency [rel. %] | PM after guard bed [mg/Nm$^3$] |
|---|---|---|
| catalyst I | 61 | ≤25 |
| catalyst II | 98 | ≤1 |
| catalyst III | 84 | ≤10 |
| catalyst IV | 34 | ≤35 |
| alumina based adsorber material | 52 | ≤25 |
| precious metal based catalytically active monolithic filter | 81 | ≤10 |

All tests were performed at increased PM loads (0.79 $g_{PM}/kg_{catalyst}h$) and the efficiency was tested after 36-45 h of PM spiking. Therefore the test is significantly underestimating the efficiency of the guard beds by intentionally overloading them. This ensures that the guard beds also operate at nonstandard conditions. Once more the excellent PM oxidizing efficiency of catalyst II is demonstrated, as already seen in Example 3-B.

Example 5

Figure 4:
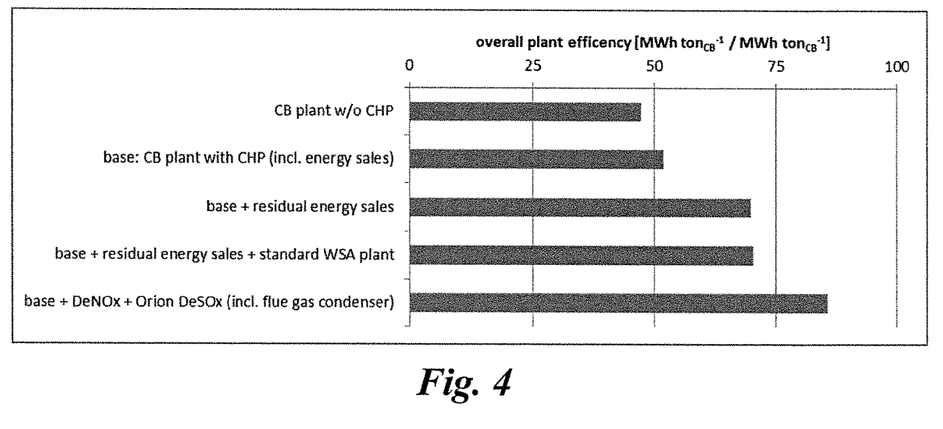
FIG. 4 is a graph showing the efficiency improvement in a carbon black process when implementing a WSA facility.

Inclusion of a WSA plant in a carbon black facility, as disclosed herein, not only addresses the tightening emission limits globally, as demonstrated in the previous examples, but also provides the significant benefit of increased overall facility efficiency (i.e. the ratio of MWh/ton$_{CarbonBlack}$). This efficiency improvement is illustrated in FIG. 4.

A carbon black facility without combined heat and power does not reach 50% overall plant efficiency. However, a facility including the disclosed methods and systems can reach >85% overall efficiency. All data for the base case plant efficiency is based on Chapter 4 of the EU BREF document (European Commission, Integrated Pollution Prevention and Control, The BAT (Best Available Techniques) Reference Document (BREF) entitled Large Volume Inorganic Chemicals—Solids and Others (LVIC-S) industry reflects an information exchange carried out under Article 16(2) of Council Directive 96/61/EC (IPPC Directive), August 2007, which is incorporated by reference herein for its teachings of carbon black process techniques, facilities, and devices.).

In addition, with the removal of NO$_x$ and SO$_x$ it is expected that the flue gas contains very low amounts of contaminants, which should further allow for straight-forward and cost effective flue gas condensation. This will further lead to increased benefits, such as lowering PM and SO$_x$ emissions even further. The PM can be virtually eliminated from the flue gas, which can allow for usage of higher-S feedstocks and thereby a possibility to maintain competitiveness (lower-S feedstocks expected to increase drastically in price over the coming years). Additional benefits can be reduced water consumption. Water consumption is another pressing issue from an environmental legislation point of view as well as cost point of view. The possibility of having a flue gas condensation unit giving clean condensate can allow for recycling the water for use as process water. Still further, a flue gas condensation unit can substantially increase the heat output to residential or commercial applications.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods and systems of the appended claims are not limited in scope by the specific methods and systems described herein, which are intended as illustrations of a few aspects of the claims and any methods and systems that are functionally equivalent are intended to fall within the scope of the claims. Various modifications of the methods and systems in addition to those shown and described herein are intended to fall within the scope of the appended claims. Further, while only certain representative method steps/system means disclosed herein are specifically described, other combinations of the method steps/system means also are intended to fall within the scope of the appended claims, even if not specifically recited. Thus, a combination of steps, elements, components, or constituents may be explicitly mentioned herein, however, other combinations of steps, elements, components, and constituents are included, even though not explicitly stated.

What is claimed is:

1. A method of reducing particulate matter from an exhaust gas from a process for the production of carbon black, comprising:
    producing carbon black and the exhaust gas in the process for the production of carbon black;
    collecting the carbon black, wherein collecting the carbon black comprises filtering to separate the carbon black from the exhaust gas, thereby producing a separated exhaust gas;
    combusting the separated exhaust gas to thereby produce a combusted exhaust gas comprising particulate matter; and
    catalytically oxidizing at least a portion of the particulate matter of the combusted exhaust gas by passing the combusted exhaust gas through a vessel comprising an oxidation catalyst, thereby removing at least a portion of the particulate matter from the combusted exhaust gas to thereby produce an oxidized exhaust gas.

2. The method of claim 1, wherein the combusted exhaust gas is not passed through an electrostatic precipitator.

3. The method of claim 1, wherein the oxidized exhaust gas comprises from 10 to 50 wt. % water, less than 10 mg/Nm$^3$ particulate matter, and from 50 ppmv to 10 wt. % sulfur dioxide.

4. The method of claim 1, wherein the exhaust gas is produced from thermal decomposition of a hydrocarbon or incomplete combustion of a hydrocarbon.

5. The method of claim 4, wherein the hydrocarbon comprises a heavy distillate oil, a heavy residual oil, a vacuum distillate oil, a heavy vacuum oil, a fluidized catalytic cracker distillate oil, a fluidized catalytic cracker residual oil, a distillate oil from coal gasification, a residual oil from coal gasification, a tar oil from coal gasification, a distillate oil from coal distillation, a residual oil from coal distillation, a tar oil from coal distillation, a distillate oil from steam cracking, a residual oil from steam cracking, a tar oil from steam cracking, a distillate oil from polymer reaction distillation processes, a residual oil from polymer reaction distillation processes, a tar oil from polymer reaction distillation processes, a distillate oil from a biological source, a fuel oil from a biological source, a residual oil from a biological source, a distillate oil from a renewable source, a fuel oil from a renewable source, a residual oil from a renewable source, or combinations thereof.

6. The method of claim 1, wherein the oxidized exhaust gas further comprises a sulfur oxide and the method further comprises treating the oxidized exhaust gas in a wet sulfuric acid process without heating the oxidized exhaust gas to thereby remove at least a portion of the sulfur oxide.

7. The method of claim 6, wherein the sulfur oxide is removed from the oxidized exhaust gas with increased thermal efficiency as compared to a method in which substantially equivalent particulate matter reduction is achieved using an electrostatic precipitator.

8. The method of claim 1, wherein the exhaust gas comprises from 1 to 5,000 mg/Nm$^3$ of particulate matter.

9. The method of claim 1, wherein the exhaust gas comprises 30 mg/Nm$^3$ or less of particulate matter.

10. The method of claim 1, wherein the combusted exhaust gas comprises from 1 to 5,000 mg/Nm$^3$ of particulate matter.

11. The method of claim 1, wherein the combusted exhaust gas comprises from 50 to 6,000 ppmv sulfur dioxide.

12. The method of claim 1, wherein the oxidation catalyst is a catalyst capable of catalytically converting $SO_2$ to $SO_3$ out of a wet gas stream.

13. The method of claim 1, wherein the oxidation catalyst oxidizes 90 wt. % or more of the particulate matter, based on the total mass of particulate matter present in the combusted exhaust gas before passing the combusted exhaust gas through the vessel comprising the oxidation catalyst.

14. The method of claim 1, wherein the oxidized exhaust gas comprises 30 mg/Nm$^3$ or less of particulate matter.

15. The method of claim 1, wherein the oxidation catalyst comprises vanadium, cobalt, molybdenum, manganese, sodium, potassium, cesium, platinum, palladium, iron, or combinations thereof.

16. The method of claim 1, wherein the oxidation catalyst is supported on a thermally stable substrate.

17. The method of claim 16, wherein the thermally stable substrate comprises alumina, silica, chromia, zirconia, tungsten, diatomaceous earth, cordierite, or combinations thereof.

* * * * *